(12) United States Patent
Severi

(10) Patent No.: US 8,383,498 B2
(45) Date of Patent: Feb. 26, 2013

(54) METHOD FOR FORMATION OF TIPS

(75) Inventor: Simone Severi, Leuven (BE)

(73) Assignee: IMEC, Leuven (BE)

( * ) Notice: Subject to any disclaimer, the term of this patent is extended or adjusted under 35 U.S.C. 154(b) by 456 days.

(21) Appl. No.: 12/675,138

(22) PCT Filed: Aug. 29, 2008

(86) PCT No.: PCT/EP2008/061434
§ 371 (c)(1),
(2), (4) Date: Feb. 25, 2010

(87) PCT Pub. No.: WO2009/027528
PCT Pub. Date: Mar. 5, 2009

(65) Prior Publication Data
US 2010/0295159 A1    Nov. 25, 2010

Related U.S. Application Data

(60) Provisional application No. 60/968,630, filed on Aug. 29, 2007.

(51) Int. Cl.
*H01L 21/22* (2006.01)
*H01L 21/31* (2006.01)

(52) U.S. Cl. .......... 438/549; 438/555; 438/40; 438/514; 438/713; 257/E21.222; 257/E21.221; 257/E21.337

(58) Field of Classification Search ............ 438/40, 438/514, 549, 555, 713, 745; 257/E21.222, 257/E21.221, E21.337
See application file for complete search history.

(56) References Cited

U.S. PATENT DOCUMENTS

| | | | | |
|---|---|---|---|---|
| 6,835,589 B2 * | 12/2004 | Pogge et al. | ..... | 438/52 |
| 7,677,088 B2 * | 3/2010 | King | ..... | 73/105 |
| 2002/0093281 A1 * | 7/2002 | Cathey | ..... | 313/336 |
| 2005/0018587 A1 | 1/2005 | Petrin | | |
| 2005/0051515 A1 * | 3/2005 | Nam | ..... | 216/27 |
| 2006/0003493 A1 | 1/2006 | Milligan et al. | | |
| 2006/0057757 A1 * | 3/2006 | Park et al. | ..... | 438/50 |
| 2006/0212978 A1 | 9/2006 | Brandenberger et al. | | |
| 2007/0041238 A1 | 2/2007 | Belov | | |
| 2009/0056428 A1 * | 3/2009 | King | ..... | 73/105 |
| 2010/0188113 A1 * | 7/2010 | King | ..... | 324/762 |

FOREIGN PATENT DOCUMENTS

| WO | WO2007/002871 | 1/2007 |
|---|---|---|
| WO | WO2008/053008 | 5/2008 |

OTHER PUBLICATIONS

Haller, I. et al., "Selective Wet and Dry Etching of Hydrogenated Amorphous Silicon and Related Materials", J. Electrochem. Soc., vol. 13, No. 8, Aug. 1988, pp. 2042-2045.
PCT International Search Report, PCT International Application No. PCT/EP2008/061434 dated Jan. 16, 2009.

* cited by examiner

*Primary Examiner* — Nitin Parekh
(74) *Attorney, Agent, or Firm* — McDonnell Boehnen Hulbert & Berghoff LLP

(57) ABSTRACT

The present invention provides a method (80) for manufacturing a semiconductor tip. The method comprises obtaining (81) a substrate provided with a layer of tip material, providing (82) a doping profile in the layer of tip material, the doping profile comprising a tapered-shaped region of a first dopant concentration, undoped or lightly doped, e.g. having a dopant concentration of $10^{17}$ cm$^{-3}$ or lower, surrounded by a region of a second dopant concentration, highly doped, e.g. having a dopant concentration above $10^{17}$ cm$^{-3}$, the first dopant concentration being lower than the second dopant concentration, and isotropically etching (83) the layer of tip material by using an etch chemistry for which the etch rate of tip material with the second dopant concentration is substantially higher than the etch rate of the tip material with the first dopant concentration.

16 Claims, 7 Drawing Sheets

METHOD FOR FORMATION OF TIPS

CROSS-REFERENCE TO RELATED APPLICATIONS

This application is a national stage application of International Application no. PCT/EP2008/061434, which claims the priority of U.S. Provisional Patent Application No. 60/968,630, filed Aug. 29, 2007.

TECHNICAL FIELD OF THE INVENTION

The present invention relates to semiconductor processing. More in particular, in embodiments thereof it relates to a method for forming small and sharp semiconductor tips. In alternative embodiments it relates to the tips themselves. The tips may for example be formed on a cantilever and may for example be used as part of a probe for probe-based data storage devices. The process may be used for forming tips on a substrate comprising electrical circuitry, e.g. CMOS circuitry.

BACKGROUND OF THE INVENTION

Data storage is one of the key elements in information technology. The ever increasing demand for more storage capacity in an ever shrinking form factor as well as the pressure to decrease the price per storage unit have been a major driving force for substantial world-wide research and development activities related to data storage devices such as magnetic hard drives, optical devices and silicon-based semiconductor memory chips. However, increasing the storage density is becoming increasingly difficult because conventional technologies appear to be approaching fundamental limits.

There is a need for solutions which permit still higher density data storage. Techniques using nanometer-sharp tips for imaging and investigating the structure of materials down to the nanometer scale, such as the atomic force and the scanning tunneling microscope, are suitable for the development of ultrahigh-density storage devices. Probe-based storage technologies can be regarded as natural candidates for extending the physical limits that are being approached by conventional storage technologies.

A solution to achieve high data rates of probe-based storage devices is to employ MEMS (Micro-Electro-Mechanical System) based arrays of cantilevers operating in parallel, with each cantilever comprising a tip for performing write/read/erase operations on an individual storage field. In order to obtain a high storage density, small and sharp tips are needed.

As described in prior art, crystalline silicon may be used for forming such tips. In US 2007/0041238 a process is described for the formation of silicon tips, the process comprising forming a hardmask layer over a silicon substrate, defining a pattern within the hardmask layer, wherein the pattern defines the tip area, isotropically etching the silicon to form a nascent tip structure surrounded by a shallow cavity, and growing a thermal oxide consuming additional silicon. In a subsequent step, the thermal oxide is etched, thereby causing the hardmask positioned over the tip structure to fall off and leaving a silicon tip. Additional thermal oxidation and oxide etching steps can be applied in order to adjust the height of the silicon tips and/or the radius of the curvature of the silicon tip.

When processing such tips on top of already formed circuitry, the maximum temperature allowed is limited, e.g. for CMOS circuitry limited to 450° C. Thermal oxidation of silicon is usually performed at a temperature between 800 and 1200° C., hence it is a disadvantage of the method described that it cannot be used for the formation of tips on top of already processed electrical circuitry, e.g. CMOS circuitry.

There is a need for a simple and reproducible process for forming small and sharp tips, e.g. on a cantilever, wherein the process temperature does not exceed 450° C.

SUMMARY OF THE INVENTION

It is an object of the present invention to provide a simple and reproducible fabrication process for the formation of small and sharp tips, e.g. tips with a top diameter of less than 100 nm, preferably less than 50 nm, wherein the highest temperature during the fabrication process is 450° C. or lower.

The above objective is accomplished by a method according to the present invention.

The present invention provides a method for manufacturing a semiconductor tip. The method comprises
obtaining a substrate provided with a layer of tip material, providing a doping profile in the layer of tip material, the doping profile comprising a tapered-shaped region of a first dopant concentration, undoped or lightly doped, e.g. having a dopant concentration of $10^{17}$ cm$^{-3}$ or lower, surrounded by a region of a second dopant concentration, highly doped, e.g. having a dopant concentration above $10^{17}$ cm$^{-3}$, the first dopant concentration being lower than the second dopant concentration, and
isotropically etching the layer of tip material by using an etch chemistry for which the etch rate of tip material with the second dopant concentration is substantially higher than the etch rate of the tip material with the first dopant concentration.

It is an advantage of a method according to embodiments of the present invention that it is easily combinable with standard semiconductor processing.

By a method according to embodiments of the present invention, sharp tips can be obtained, e.g. tips having a top diameter below 100 nm, e.g. a diameter between 1 and 100 nm or between 1 and 50 nm or between 1 and 20 nm or between 1 and 10 nm. The method according to embodiments of the present invention may further comprise forming an electrically conductive layer on the tip.

In a method according to embodiments of the present invention, providing a tapered-shaped region may comprise providing any of a conically-shaped region, a pyramidally-shaped region or a wedge-shaped region. A tapered-shaped region is a region which becomes gradually narrower or thinner towards an end away from the substrate.

In a method according to embodiments of the present invention, providing a doping profile in the layer of tip material may comprise:
forming a hardmask on the layer of tip material, e.g. a circular hardmask, and performing a doping step, thereby using the hardmask as a mask.

It is an advantage of embodiments of the present invention that variation of tip radius are limited by dopant fluctuations, which are in the range of a few nm only. Hence very accurate tip dimensions can be obtained. Furthermore, after etching a smooth interface is obtained.

A method according to embodiments of the present invention may furthermore comprise removing the hardmask. Isotropically etching may then be performed before or after removing the hardmask. If the isotropic etching is performed before removing the hardmask the resulting tip will be taller (having height dimensions between 1 and 2 um) than in case the hardmask is removed before the isotropic etching. In embodiments according to the present invention the hardmask layer may be removed after partially etching the layer of tip material. In a method according to embodiments of the present invention, providing a doping profile may be performed by means of ion implantation, e.g. by means of subsequent ion implantation steps with different implantation energies, e.g. implantation energies between 750 KeV and 60 KeV. In a particular embodiment, the doping profile may be an n-type doping profile, e.g. a Phosphorous doping profile. The doping concentration in the lightly doped region may be less than $10^{17}$ cm$^{-3}$. The doping concentration in the highly doped region may be higher than $10^{17}$ cm$^{-3}$, preferably higher than $10^{18}$ cm$^{-3}$.

In a method according to embodiments of the present invention, isotropically etching may be performed by a dry etching step, such as e.g. a fluorine-based dry etching step. The etch rate of the tip material with the second dopant concentration (highly doped) may be at least a factor of 2, preferably a factor of 3, higher than the etch rate of the tip material with the first dopant concentration (lowly doped or undoped).

In a method according to embodiments of the present invention, the substrate may comprise electrical circuitry, e.g. CMOS circuitry. This electrical circuitry may be present before formation of the tip in accordance with embodiments of the present invention is started. This is advantageous, as high temperature processes for formation of the electrical circuitry can be performed first.

A method according to embodiments of the present invention may be performed at temperatures not exceeding 450° C., e.g. at temperatures not exceeding 400° C. The layer of tip material may be a semiconductor material, preferably a semiconductor material that may be provided at temperatures not exceeding 450° C., such as for example amorphous silicon which maybe deposited at 300° C. or silicon germanium which may be deposited at 420° C., e.g. microcrystalline silicon germanium.

It is an advantage of embodiments of the present invention that the process for forming tips can be performed at low temperatures, e.g. the process for forming tips allows processing after electrical circuitry has already been formed, without destroying the electrical circuitry already formed, e.g. post CMOS processing.

A method according to embodiments of the present invention may be performed on a substrate, wherein the substrate is part of or is formed on top of a cantilever structure. In embodiments of the present invention, the tip may e.g. be used as part of a probe-based data storage device. In alternative embodiments, the cantilever structure may be part of a cantilever electrical connector elements as used in the manufacture of e.g. probe cards for testing integrated circuits and similar items. A cantilever electrical connector is designed so as to provide electrical contact between an electrical contact point, such as e.g. a contact pad, on a device under test and another electrical contact point, such as e.g. another contact pad, on a testing apparatus. Thus the cantilever electrical connector provides a portion of an electrical path in a probe card assembly, where the probe card assembly provides the electrical interconnection between a device under test and a testing apparatus.

It is an advantage of the method according to the present invention that a sharp tip can be directly formed during isotropic etching and that the need for repeated thermal oxidation and oxide etching steps as in prior art methods can be avoided.

Further advantages are the process simplicity and the process uniformity. Variation of the tip radius may be limited by dopant fluctuations in the range of a few nm.

In another aspect, the present invention provides a semiconductor tip on top of CMOS, wherein the semiconductor tip has a top diameter of less than 20 nm, e.g. between 1 and 20 nm or between 1 and 10 nm. The semiconductor tip may be formed by a method according to method embodiments of the present invention.

In yet another embodiment, a semiconductor tip is provided which is characterised in that it has a top diameter of less than 20 nm, e.g. between 1 and 20 nm, and a surface roughness of less than 5 nm. Particular and preferred aspects of the invention are set out in the accompanying independent and dependent claims. Features from the dependent claims may be combined with features of the independent claims and with features of other dependent claims as appropriate and not merely as explicitly set out in the claims.

The invention, both as to organization and method of operation, together with features and advantages thereof, may best be understood by reference to the following detailed description when read with the accompanying drawings which illustrate, by way of example, the principles of the invention. This description is given for the sake of example only, without limiting the scope of the invention. The reference figures quoted below refer to the attached drawings.

Figure 1:
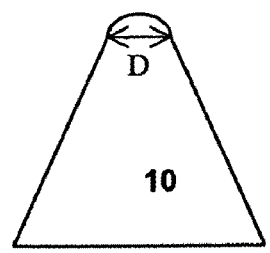
FIG. 1 is a schematic cross-section of a sharp tip as may be formed in accordance with embodiments of the present invention, wherein D is the top diameter.

In the different figures, the same reference signs refer to the same or analogous elements.

DESCRIPTION OF ILLUSTRATIVE EMBODIMENTS

In the following detailed description, numerous specific details are set forth in order to provide a thorough understanding of the invention and how it may be practiced in particular embodiments. However, it will be understood that the present invention may be practiced without these specific details. In other instances, well-known methods, procedures and techniques have not been described in detail, so as not to obscure the characteristics of the present invention. While the present invention will be described with respect to particular embodiments and with reference to certain drawings, the invention is not limited thereto but only by the claims. The drawings included and described herein are schematic and are not limiting the scope of the invention. It is also noted that in the drawings, the size of some elements may be exaggerated and, therefore, not drawn to scale for illustrative purposes. The dimensions and the relative dimensions do not correspond to actual reductions to practice of the invention.

Furthermore, the terms first, second, third and the like in the description and in the claims, are used for distinguishing between similar elements and not necessarily for describing a sequence, either temporally, spatially, in ranking or in any other manner. It is to be understood that the terms so used are interchangeable under appropriate circumstances and that the embodiments of the invention described herein are capable of operation in other sequences than described or illustrated herein.

Moreover, the terms top, bottom, over, under and the like in the description and the claims are used for descriptive purposes and not necessarily for describing relative positions. It is to be understood that the terms so used are interchangeable under appropriate circumstances and that the embodiments of the invention described herein are capable of operation in other orientations than described or illustrated herein.

It is to be noticed that the term "comprising" should not be interpreted as being restricted to the means listed thereafter; it does not exclude other elements or steps. It is thus to be interpreted as specifying the presence of the stated features, integers, steps or components as referred to, but does not preclude the presence or addition of one or more other features, integers, steps or components, or groups thereof. Thus, the scope of the expression "a device comprising means A and B" should not be limited to devices consisting only of components A and B. It means that with respect to the present invention, the only relevant components of the device are A and B.

All numbers expressing dimensions, e.g. thicknesses, and dopant concentrations and so forth are to be understood as being modified in all instances by the term "about". Accordingly, unless indicated to the contrary, the numerical parameters set forth in the specification and attached claims are approximations that may vary depending upon the desired properties sought to be obtained by the present invention. At the very least, each numerical parameter should be construed in light of the number of significant digits and ordinary rounding approaches.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment, but may. Furthermore, the particular features, structures or characteristics may be combined in any suitable manner, as would be apparent to one of ordinary skill in the art from this disclosure, in one or more embodiments.

Similarly it should be appreciated that in the description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the detailed description are hereby expressly incorporated into this detailed description, with each claim standing on its own as a separate embodiment of this invention. Furthermore, while some embodiments described herein include some but not other features included in other embodiments, combinations of features of different embodiments are meant to be within the scope of the invention, and form different embodiments, as would be understood by those in the art. For example, in the following claims, any of the claimed embodiments can be used in any combination.

The invention will now be described by a detailed description of several embodiments of the invention. It is clear that other embodiments of the invention can be configured according to the knowledge of persons skilled in the art without departing from the technical teaching of the invention as defined by the appended claims.

In the following, the detailed description relates to a method for forming small and sharp tips, e.g. with a height between 1 µm and 2 µm and a top diameter between 1 and 100 nm, by means of MEMS processing, e.g. on a cantilever structure, for use for example in probe-based data storage devices. However, the present invention is not limited thereto, and more generally relates to a method for forming small and sharp tips by MEMS processing on a substrate.

Figure 8:
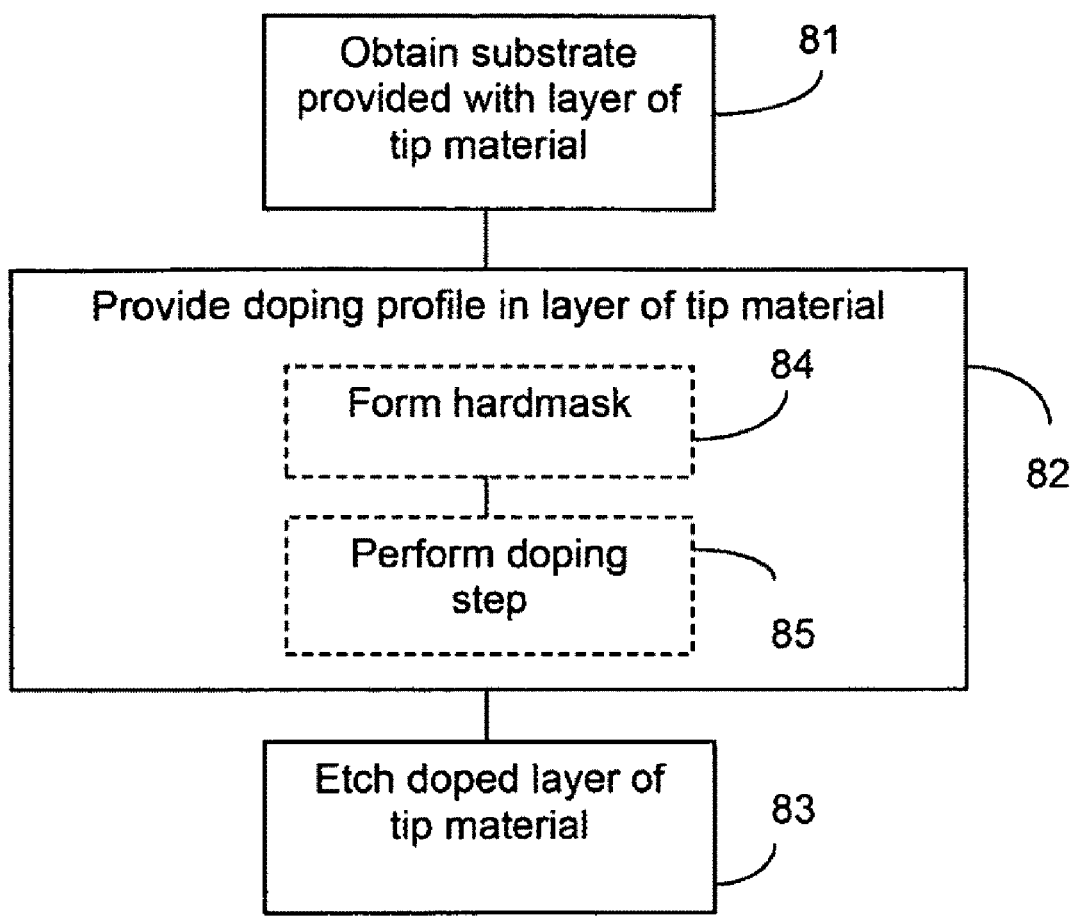
FIG. 8 is a flowchart illustrating a method of fabrication according to embodiments of the present invention.

A general overview of steps of a method according to embodiments of the present invention is shown in the flow chart of FIG. 8.

Figure 2:
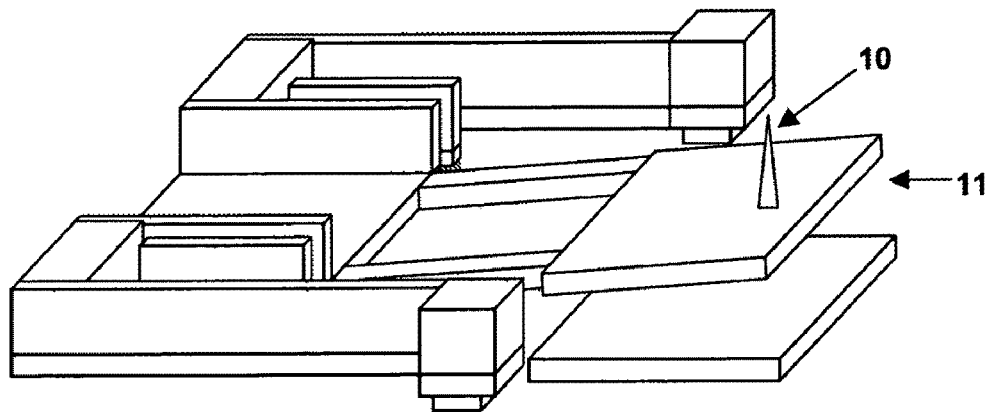
FIG. 2 is a schematic representation of a cantilever structure with a sharp tip as formed in accordance with embodiments of the present invention.

The present invention provides a simple method 80 for manufacturing sub-micron and sharp tips, for example tips with a top diameter below 100 nm, e.g. below 50 nm, wherein the tip manufacturing process is performed at temperatures not exceeding 450° C. Such sharp tips may for example be formed on cantilever structures and may for example be used for probe-based data storage systems, e.g. comprising a plurality of probes comprising sharp tips. FIG. 1 is a schematic representation (cross-section) of a tip 10 with top diameter D. The top diameter D of the tip may be as small as possible, for example less than 100 nm, preferably less than 50 nm. FIG. 2 shows a cantilever structure 11 with a sharp tip 10, as may be used for example in probe-based data storage systems.

It is an advantage of the manufacturing method according to embodiments of the present invention that it may be used for post-electronic circuitry processing, e.g. post-CMOS processing, wherein first integrated circuits, e.g. CMOS circuits, are processed and then the MEMS devices, e.g. cantilever and cantilever tip, typically on top of the integrated circuitry. For example, a process as described in EP-07061731 may be used for MEMS post-processing, wherein the CMOS circuitry is protected by a protection layer during MEMS processing, and wherein electrical connections may be made between the MEMS devices and the CMOS circuitry underneath.

As described above, in embodiments of the present invention sharp tips may be formed on a cantilever, e.g. MEMS cantilever. The structural material for forming the cantilever structure may be any suitable material, for example SiGe (e.g. deposited at 450° C. or at a temperature lower than 450° C.) while the sacrificial layer, such as e.g. $SiO_2$, may for example be an oxide, e.g. HDP (high-density plasma) oxide. However, other materials may be used for forming the cantilever structure and other materials may be used for the sacrificial layer. The cantilever may furthermore be covered with additional layers, such as e.g. an electrically insulating layer. After the cantilever is completed, a process for forming a tip according to embodiments of the present invention may be performed.

Detailed method steps of a method 80 for forming a tip according to embodiments of the present invention are illustrated in FIG. 3(a) to FIG. 3(d).

Figure 3A:
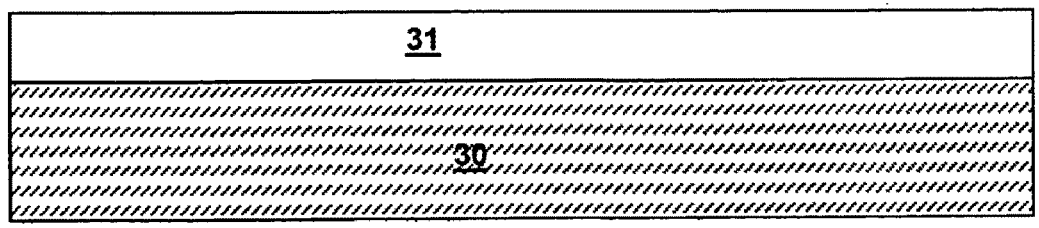
FIG. 3(a) to FIG. 3(d) illustrate different method steps in a process for the formation of a tip in accordance with embodiments of the present invention.

In a first step 81, a substrate is obtained, which is provided with a layer of tip material. This may be performed by obtaining a substrate 30, and depositing a layer 31 of tip material on the substrate 30, as illustrated in FIG. 3(a).

In embodiments of the present invention, the term "substrate" may include any underlying material or materials that may be used, or upon which a sharp tip 10 in accordance with embodiments of the present invention may be formed. The substrate 30 may for example include a semiconductor substrate such as e.g. doped silicon, a gallium arsenide (GaAs), a gallium arsenide phosphide (GaAsP), an indium phosphide (InP), a germanium (Ge), or a silicon germanium (SiGe) substrate. The substrate 30 may include for example an insulating layer such as a $SiO_2$ or a $Si_3N_4$ layer in addition to a semiconductor substrate portion. The substrate 30 may comprise electrical circuitry, e.g. at least one transistor, e.g. CMOS transistor. The term "substrate" is thus used to define generally the elements for layers that underlie a layer or portions of interest. Also, the substrate 30 may be any other base on which a layer is formed, for example a glass or metal layer. Substrate 30 may for example represent the top layer of the cantilever, e.g. SiGe cantilever. This top layer of the cantilever may e.g. be an electrically insulating layer, such as for example a SiC layer.

The layer 31 of tip material may for example be layer of amorphous silicon or micro-crystalline silicon germanium. However, layers of other tip material may be used as well. The layer 31 of tip material may be an undoped or a lowly doped layer of material, e.g. with a dopant concentration of $10^{17}$ $cm^{-3}$ or lower. When forming the tips 10 on a substrate 30 comprising electrical circuitry, e.g. CMOS circuitry, any suitable material that can be deposited at a temperature not exceeding 450° C. and that can be isotropically etched with a good selectivity to the top layer of the substrate, e.g. the top layer of the cantilever structure, e.g. SiC layer, may be used. The thickness of the layer 31 of tip material may for example be in the range between 0.5 µm and 5 µm, e.g. between 0.5 µm and 3 µm, e.g. between 1 µm and 2 µm. Deposition of the tip material may be done for example by means of Chemical Vapour Deposition (CVD), Plasma Enhanced CVD or Plasma Assisted CVD techniques and may be performed at temperatures not exceeding 450° C. For example, deposition of a silicon germanium layer may be performed at a deposition temperature of 300° C. to 450° C.; also deposition of an amorphous silicon layer may be performed at a temperature in the range between 300° C. and 450° C.

Figure 3B:
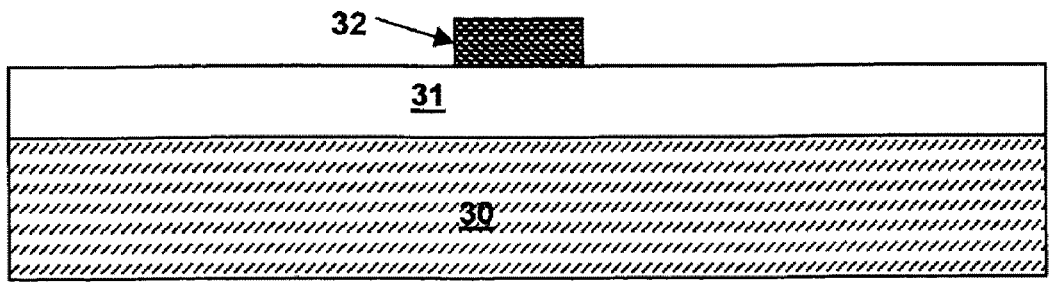
Figure 5:
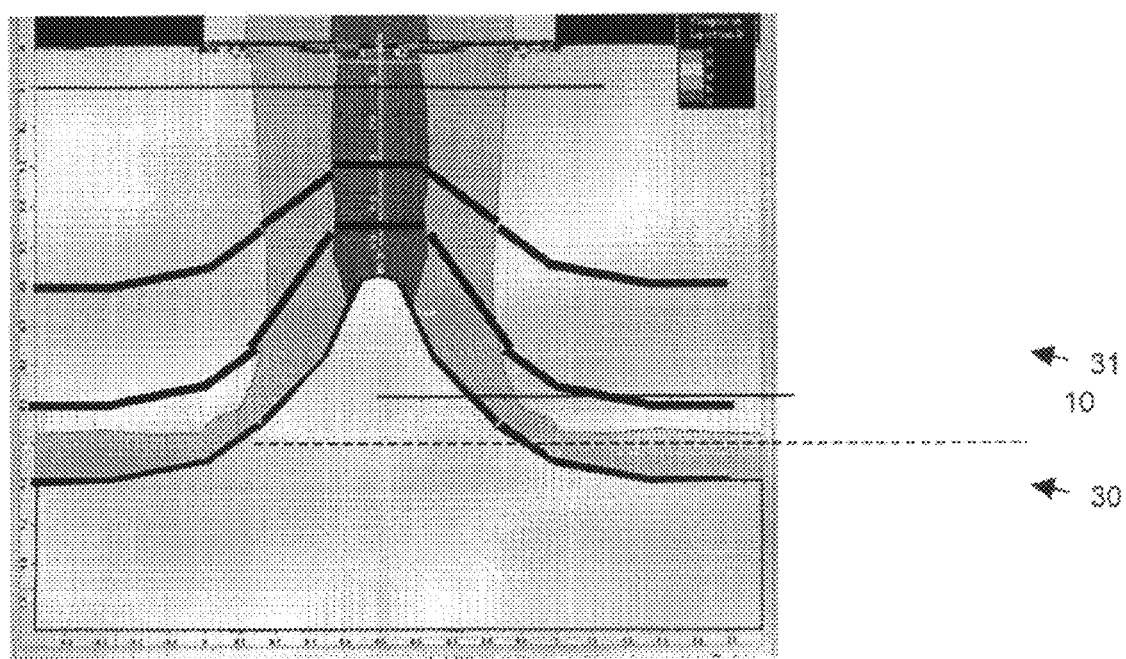
FIG. 5 shows the result of a SUPREM4 simulation of the structure shown in FIG. 4, after removing the hardmask layer and isotropic dry etching, assuming a twice higher etch rate for highly doped amorphous silicon ($10^{20}$ cm$^{-3}$) as compared to lowly doped amorphous silicon ($10^{17}$ cm$^{-3}$).
Figure 6:
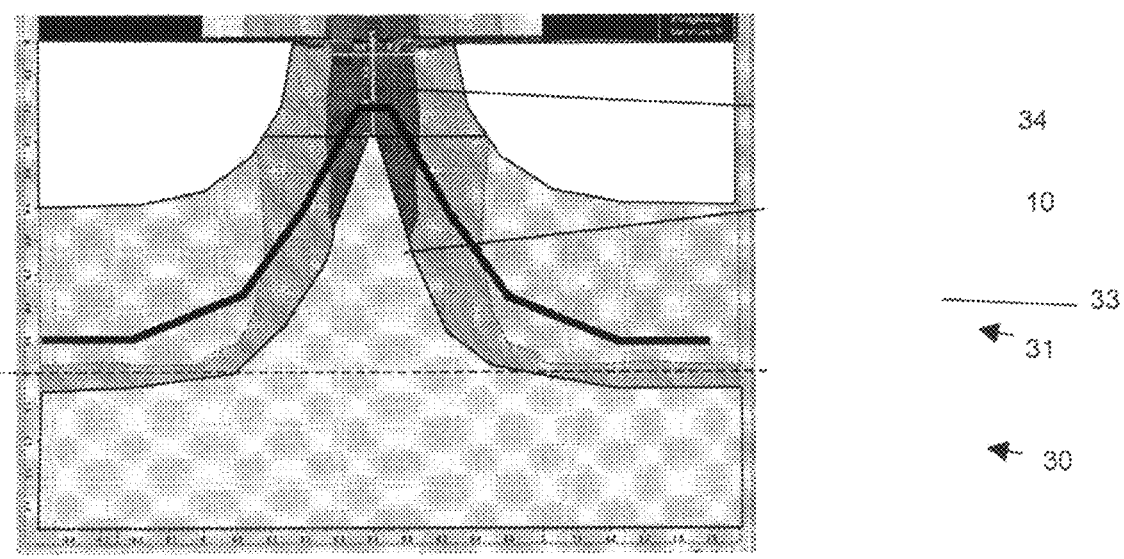
FIG. 6 shows the result of a SUPREM4 simulation of the structure shown in FIG. 4, after partial isotropic dry etching of the amorphous silicon layer, removal of the hardmask layer and further isotropic dry etching of the amorphous silicon layer, assuming a twice higher etch rate for highly doped amorphous silicon ($10^{20}$ cm$^{-3}$) as compared to lowly doped amorphous silicon ($10^{17}$ cm$^{-3}$).
Figure 7:
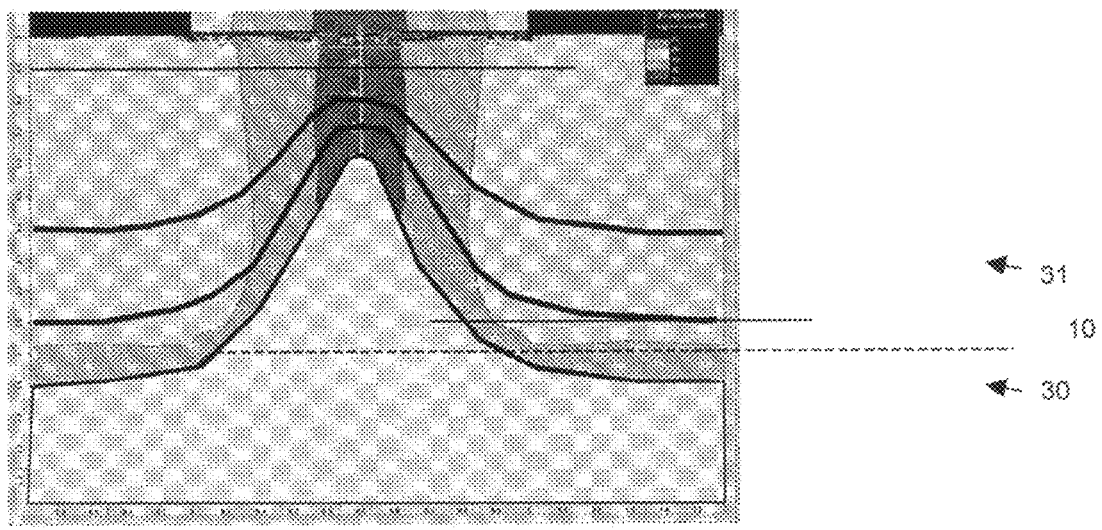
FIG. 7 shows the result of a SUPREM4 simulation of the structure shown in FIG. 4, after removing the hardmask layer and isotropic dry etching, assuming a 3 times higher etch rate for highly doped amorphous silicon ($10^{20}$ cm$^{-3}$) as compared to lowly doped amorphous silicon ($10^{17}$ cm$^{-3}$).

After obtaining the substrate 30 provided with a layer 31 of tip material, e.g. after deposition of the layer 31 of tip material layer on the substrate 30, a doping profile may be provided in the layer 31 of tip material, as illustrated in the second step 82 of the flowchart in FIG. 8, e.g. by implantation. The 2-D distribution of the doping profile is indicated in FIG. 5, FIG. 6 and FIG. 7. To provide the doping profile in the layer 31 of tip material, a hardmask layer 32, e.g. a resist layer, may be deposited and patterned by means of any suitable method known by a person skilled in the art, as illustrated in FIG. 3(b), and in step 84 of the flowchart of FIG. 8. The hardmask layer 32 may be a layer of material having a high selectivity relatively to the underlying layer 31 of tip material, for example it may be photosensitive polymers. The hardmask material may be applied by any suitable means, for example by spin-coating. After applying the layer 32 of hardmask material, it may be patterned by means of photolithography. A latent image may be formed in the hardmask layer 32, e.g. via exposure to ultraviolet light through a photomask with opaque and transparent regions, or by direct writing using a laser beam or electron beam. Areas of the hardmask layer 32 that have or have not been exposed (depending on whether the hardmask material is a so-called positive or negative material) are removed by rinsing with an appropriate solvent. Such patterning the hardmask layer 32 may comprise forming a spot, e.g. a circular spot, where later on during processing the tip 10 is to be located. The diameter of such a circular spot may for example be in the range between 0.5 µm and 3 µm, e.g. between 1 µm and 2 µm.

Figure 3C:
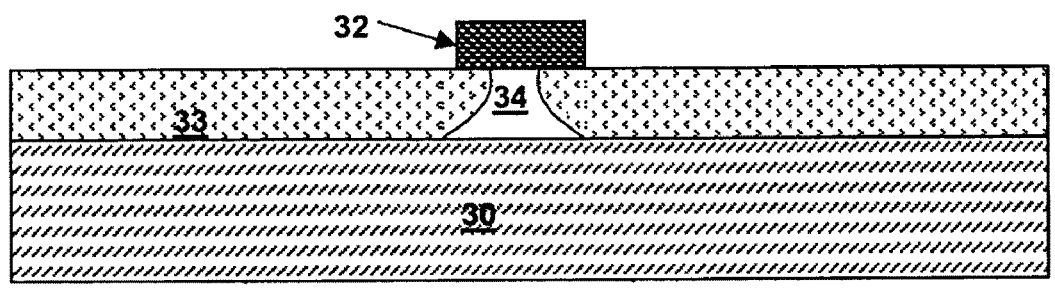

Next a doping step 85 is performed, such as for example a Phosphorous doping step. Other dopants may be used. However, the etch rate variation between an undoped and a P-doped layer can be up to a factor three, which is particularly advantageous. Doping may be done by means of any suitable technique known by a person skilled in the art. In a preferred embodiment doping may be done by means of ion implantation. This is a very controllable method, and the implanted profile may have a particularly advantageous depth. A medium energy implanter may be used, e.g. with an energy in the range between 60 KeV and 750 KeV. Conventional doses and tilt values may be used, e.g. a dose of ~1 $e^{15}$ $cm^{-2}$ and a tilt angle of ~0 deg. However, other doses and/or tilt angles are possible as well. In embodiments of the present invention, doping by means of ion implantation may comprise performing a plurality of subsequent ion implantation steps with different implantation energies and/or different doses. In a preferred embodiment the resulting doping profile in the layer 31 of tip material comprises a conically shaped undoped or lightly doped region 34 where the tip 10 is to be located (i.e. under the patterned hardmask layer 32) surrounded by a highly doped region 33. The doping concentration in the highly doped region may be higher than $10^{17}$ $cm^{-3}$, preferably higher than $10^{18}$ $cm^{-3}$. The structure after performing the doping step is illustrated in FIG. 3(c), showing the highly doped part 33 of the layer 31 of tip material and the lowly doped or undoped part 34 of the layer 31 of tip material underneath the hardmask 32.

Figure 3D:
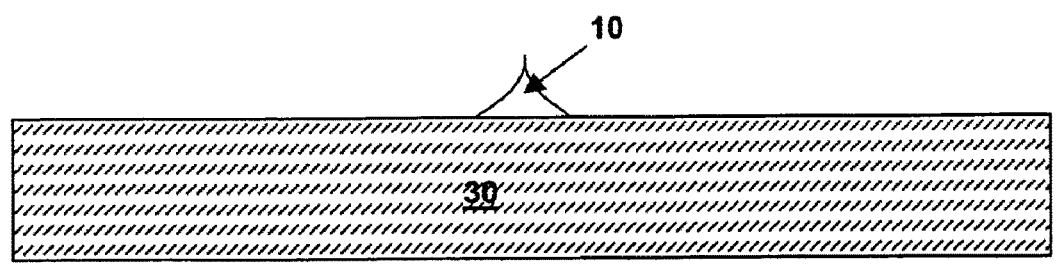

To form the tip 10, an isotropic etch step of the doped layer 33, 34 of tip material is performed, as in the third step 83 of the flow chart of FIG. 8, wherein the etch rate of the doped region 33 of the layer of tip material is faster (preferentially 2 to 3 times faster) than the etch rate of the lowly doped or undoped region 34 of the layer of tip material. The isotropic etch step may for example comprise a dry etch step, e.g. a fluorine-based etch step (e.g. with $CHF_3$, CF4, $SF_6$). For example, it is known that the etch rate of P-doped amorphous silicon in a $CF_4$-$O_2$ plasma is about 2 times faster than the etch rate of the lowly doped or undoped material. (I. Haller et al., "Selective Wet and Dry Etching of Hydrogenated Amorphous Silicon and Related Materials", J. Electrochem. Soc, Vol. 13, No. 8, August 1988, 2042-2045). Further optimization of etch process parameters such as time, uniformity, may lead to a still higher etch selectivity. Because of a difference in etch rate between highly doped and lightly doped or undoped tip material, the result of an isotropic etch may be a sharp circular tip 10, as shown in FIG. 3(d). As an alternative for dry etching, also isotropic wet etching may be used. However, wet etching may be less accurate and may suffer from less uniformity across the wafer as compared to dry etching.

In embodiments of the present invention, the hardmask 32 may be removed before starting the isotropic etch step 83. In alternative embodiments, the hardmask 32 may not be removed before starting the isotropic etch step 83. For example, a partial etch of the layer 33, 34 of tip material may be performed before removing the hardmask 32.

After forming a tip 10 according to embodiments of the present invention, the tip 10 may be coated with an electrically conductive layer (not illustrated in the drawings), e.g. a metal layer, e.g. a Pt layer. In a preferred embodiment the electrically conductive layer may comprise e.g. a thin layer (e.g. between 8 and 12 nm, e.g. 10 nm) of TiN providing good adhesion and a thin layer (e.g. 80 to 100 nm) of Pt. However, other materials and other layer thicknesses may be used. The electrically conductive layer may be applied in any suitable way, e.g.

may be sputtered onto the tip 10. The electrically conductive material covering the tip 10 may have a high electrical conductivity, may be wear resistant and may be chemically inert. The electrically conductive layer can be etched to form the contact surface of the tip 10. Alternatively, a lift-off process can be used for patterning the electrically conductive layer of the tip 10.

It is an advantage of a method according to embodiments of the present invention that a sharp tip can be directly formed during isotropic etching and that the need for repeated thermal oxidation and oxide etching steps as in prior art methods can be avoided. It is a further advantage of the method according to embodiments of the present invention that the process for forming tips can be performed at temperatures not exceeding 450° C., thus allowing processing of the tip after processing of electrical circuitry, e.g. allowing post-CMOS processing. Further advantages are the process simplicity and the process uniformity. Variation of the tip radius may be limited by dopant fluctuations in the range of a few nm.

Technology Computer Aided Design (TCAD) simulations of methods according to embodiments of the present invention have been performed, e.g. SUPREM4 simulations, the results of which are illustrated in FIG. 4 to FIG. 7.

Figure 4:
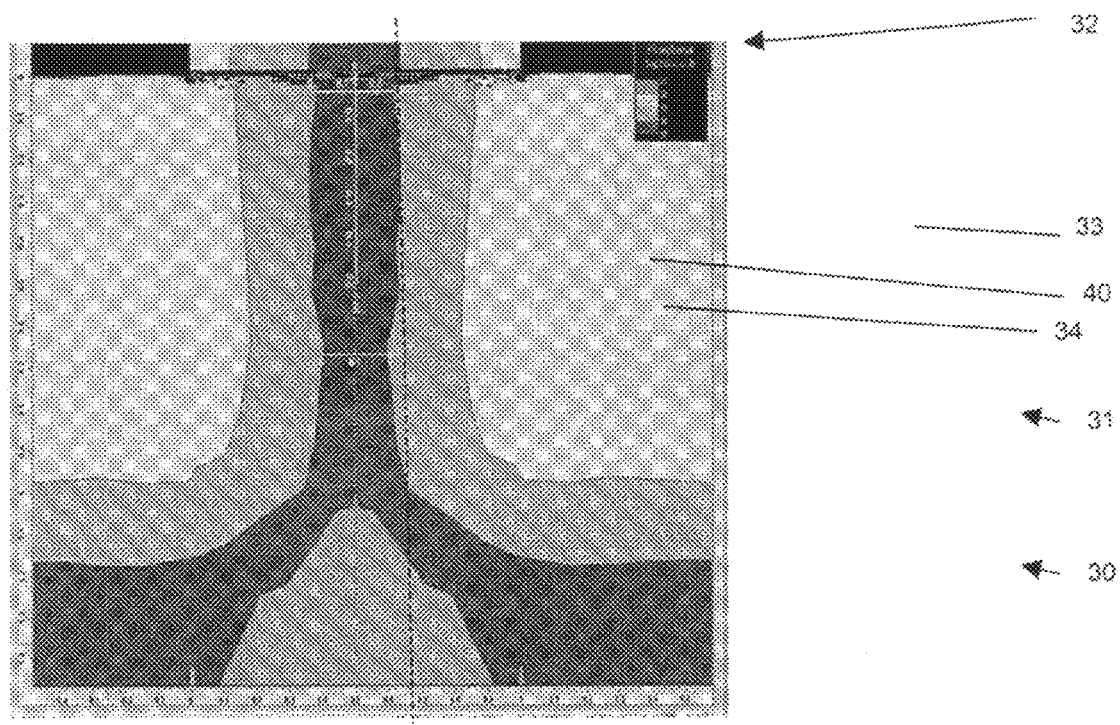
FIG. 4 shows the result of a SUPREM4 simulation, showing the P concentration after P implantation in a 1 μm thick amorphous silicon layer with a circular hardmask layer on top of it, the hardmask having a circular shape with a diameter of 1 μm.

For the layer 31 of tip material, a 1 μm thick amorphous silicon layer was assumed, with a 1.8 μm thick hardmask (resist) layer 32 with a circular pattern on top of it, the hardmask circle having a diameter of 1 μm. P implantation simulations (FIG. 4) show that a suitable P concentration profile may be obtained after subsequent implantation steps with implantation energies of 750 KeV, 500 KeV, 250 KeV and 60 KeV and an implantation dose of 1 $e^{15}$ $cm^{-2}$, with 0 degrees tilt. The simulation results of FIG. 4 show that implantation around the circular hardmask 32 creates a high P concentration region 33 at the edges of the hardmask 32, and that the dopant lateral straggle provides a doping gradient towards the center 40 of the circular hardmask 32. The dopant lateral straggle defines a conically shaped undoped or lightly doped region 34 in the tip material layer 31 under the center of the hardmask 32.

FIG. 5 and FIG. 7 show superimposed on the result of a SUPREM4 simulation of the structure shown in FIG. 4, the resulting structure, including tip 10, after removing the hardmask layer 32 followed by isotropic dry etching, assuming a 2 times (FIG. 5) and a 3 times (FIG. 7) higher etch rate for highly doped ($10^{20}$ $cm^{-3}$) amorphous silicon region 33 as compared to lowly doped ($10^{17}$ $cm^{-3}$) amorphous silicon region 34. Given the doping profile (FIG. 4) and given the difference in etch rate between highly P-doped region 33 and lowly doped silicon region 34, the silicon region 33 at the hardmask edges may etch faster than the silicon region 34 under the center of the hardmask 32, and a tip shape may be obtained. Comparing the simulation results of FIG. 5 and FIG. 7, it can be concluded that a sharper tip with a smaller top diameter may be obtained for the case with a higher etch selectivity.

FIG. 6 shows, superimposed on a part of the result of a SUPREM4 simulation of the structure shown in FIG. 4, the resulting structure, including tip 10, after partial isotropic dry etching of the amorphous silicon layer, removal of the hardmask layer 32 and further isotropic dry etching of the amorphous silicon layer, assuming a 2 times higher etch rate for highly doped ($10^{20}$ $cm^{-3}$) amorphous silicon region 33 as compared to lowly doped ($10^{17}$ $cm^{-3}$) amorphous silicon region 34. Comparing the simulation results of FIG. 5 and FIG. 6, it can be concluded that a partial isotropic etching before removing the hardmask layer 32 may be beneficial for obtaining a sharper tip with a smaller top diameter.

The foregoing description details certain embodiments of the invention. It will be appreciated, however, that no matter how detailed the foregoing appears in text, the invention may be practiced in many ways. It should be noted that the use of particular terminology when describing certain features or aspects of the invention should not be taken to imply that the terminology is being re-defined herein to be restricted to include any specific characteristics of the features or aspects of the invention with which that terminology is associated.

It is to be understood that although preferred embodiments, specific constructions and configurations, as well as materials, have been discussed herein for devices according to the present invention, various changes or modifications in form and detail may be made without departing from the scope of this invention as defined by the appended claims.

The invention claimed is:

1. A method for manufacturing a semiconductor tip, the method comprising:
   obtaining a substrate provided with a layer of tip material,
   providing a doping profile in the layer of tip material, the doping profile comprising a tapered-shaped region of a first dopant concentration formed in a first doping step surrounded by a region of a second dopant concentration formed in a second doping step, the first dopant concentration being lower than the second dopant concentration, and
   isotropically etching the layer of the tip material by using an etch chemistry for which the etch rate of the tip material with the second dopant concentration is substantially higher than the etch rate of the tip material with the first dopant concentration.

2. The method according to claim 1, wherein providing a tapered-shaped region comprises providing any of a conically-shaped region, a pyramidally-shaped region or a wedge-shaped region.

3. The method according to claim 1, wherein providing a doping profile in the layer of tip material comprises:
   forming a hardmask on the layer of tip material, and
   performing a doping step, thereby using the hardmask as a mask.

4. The method according to claim 3, further comprising removing the hardmask wherein isotropically etching is performed before or after removing the hardmask.

5. The method according to claim 1, wherein providing a doping profile is performed by ion implantation.

6. The method according to claim 1, wherein the isotropically etching is performed by a dry etching step.

7. The method according to claim 1, wherein the substrate comprises electrical circuitry.

8. The method according to claim 1, wherein the method is performed at temperatures not exceeding 450° C.

9. The method according to claim 1, wherein the substrate is part of or is formed on top of a cantilever structure.

10. The method according to claim 1, wherein the semiconductor tip is formed with a top diameter of less than 20 nm.

11. The method according to claim 1, wherein the semiconductor tip has a surface roughness of less than 5 nm.

12. A semiconductor tip on top of a CMOS structure, formed by the method according to claim 1.

13. A probe-based storage device comprising the semiconductor tip according to claim 12.

14. A semiconductor tip fabricated by the method of claim 1.

15. A probe-based storage device comprising the semiconductor tip according to claim 14.

16. A method for manufacturing a semiconductor tip on a substrate, the method comprising:

obtaining a substrate provided with a layer of tip material, forming a hardmask on the layer of tip material, performing a doping step, thereby using the hardmask as a mask, thereby forming a doping profile in the layer of tip material, the doping profile comprising a tapered-shaped region of a first dopant concentration formed in a first doping step surrounded by a region of a second dopant concentration formed in a second doping step, the first dopant concentration being lower than the second dopant concentration, and isotropically etching the layer of the tip material by using an etch chemistry for which the etch rate of the tip material with the second dopant concentration is substantially higher than the etch rate of the tip material with the first dopant concentration.

* * * * *